US010810860B1

(12) United States Patent
Eubanks et al.

(10) Patent No.: US 10,810,860 B1
(45) Date of Patent: Oct. 20, 2020

(54) INTELLIGENT VENT HOOD

(71) Applicant: ObjectVideo Labs, LLC, Tysons, VA (US)

(72) Inventors: Dana Eubanks, Tysons, VA (US); Donald Madden, State College, PA (US)

(73) Assignee: ObjectVideo Labs, LLC, Tysons, VA (US)

(*) Notice: Subject to any disclaimer, the term of this patent is extended or adjusted under 35 U.S.C. 154(b) by 0 days.

(21) Appl. No.: 16/239,309

(22) Filed: Jan. 3, 2019

Related U.S. Application Data

(60) Provisional application No. 62/613,251, filed on Jan. 3, 2018.

(51) Int. Cl.
| G08B 17/00 | (2006.01) |
| G08B 21/22 | (2006.01) |
| F24C 15/20 | (2006.01) |
| G01J 5/00 | (2006.01) |
| G08B 17/10 | (2006.01) |
| G08B 21/18 | (2006.01) |
| F27D 21/02 | (2006.01) |
| F27D 21/00 | (2006.01) |

(52) U.S. Cl.
CPC .......... *G08B 21/22* (2013.01); *F24C 15/2042* (2013.01); *G01J 5/0044* (2013.01); *G08B 17/10* (2013.01); *G08B 21/182* (2013.01); *F27D 21/0014* (2013.01); *F27D 2021/026* (2013.01)

(58) Field of Classification Search
CPC ...... G08B 21/22; G08B 17/10; G08B 21/182; F24C 15/2042; G01J 5/0044; F27D 21/0014; F27D 2021/026

USPC .......................................................... 340/584
See application file for complete search history.

(56) References Cited

U.S. PATENT DOCUMENTS

| 6,920,874 | B1* | 7/2005 | Siegel | F24C 15/2021 |
| | | | | 126/21 A |
| 9,335,057 | B2* | 5/2016 | Bagwell | F15D 1/02 |
| 9,909,766 | B2* | 3/2018 | Bagwell | F24C 15/2021 |
| 10,364,989 | B2* | 7/2019 | Yu | G05B 19/418 |
| 10,573,146 | B1* | 2/2020 | Jordan, II | G01C 21/20 |
| 2008/0141996 | A1* | 6/2008 | Erdmann | F24C 15/2042 |
| | | | | 126/299 D |
| 2008/0274683 | A1* | 11/2008 | Burdett | F24C 15/2042 |
| | | | | 454/61 |

(Continued)

FOREIGN PATENT DOCUMENTS

JP          2015010794 A * 1/2015     ............... F24F 7/06

*Primary Examiner* — Zhen Y Wu
(74) *Attorney, Agent, or Firm* — Fish & Richardson P.C.

(57) ABSTRACT

A vent hood device that is configured to monitor a stove, the vent hood device including, a camera, an infrared sensor that is configured to detect heat from a surface of the stove, and a processor that is configured to receive, from the infrared sensor, temperature data that indicates heat detected from the surface of the stove, receive, from the camera, video data captured by the camera, determine, based on the temperature data and the video data, that an adult is not within a field of view of the camera and the heat detected from the surface of the stove satisfies a heat criteria, and in response to determining that an adult is not within the field of view of the camera and the heat detected from the surface of the stove satisfies the heat criteria, provide an alert that indicates that the stove is unattended.

16 Claims, 6 Drawing Sheets

(56) References Cited

U.S. PATENT DOCUMENTS

| | | | | |
|---|---|---|---|---|
| 2009/0061752 | A1* | 3/2009 | Burdett | F24C 15/20 |
| | | | | 454/61 |
| 2011/0005507 | A9* | 1/2011 | Bagwell | F15D 1/02 |
| | | | | 126/299 R |
| 2011/0308825 | A1* | 12/2011 | Lee | F24C 15/2021 |
| | | | | 169/65 |
| 2013/0002845 | A1* | 1/2013 | Fedorenko | G08B 13/19604 |
| | | | | 348/77 |
| 2013/0149949 | A1* | 6/2013 | Livchak | F24C 15/20 |
| | | | | 454/67 |
| 2013/0213483 | A1* | 8/2013 | Bagwell | F24C 15/20 |
| | | | | 137/2 |
| 2014/0120819 | A1* | 5/2014 | Stakutis | B08B 15/023 |
| | | | | 454/56 |
| 2014/0230662 | A1* | 8/2014 | Siegel | F24C 15/2021 |
| | | | | 99/344 |
| 2014/0234496 | A1* | 8/2014 | Siegel | F23N 5/242 |
| | | | | 426/231 |
| 2015/0039104 | A1* | 2/2015 | Nakatani | H04L 67/125 |
| | | | | 700/83 |
| 2015/0136430 | A1* | 5/2015 | Livchak | A62C 3/006 |
| | | | | 169/46 |
| 2015/0137967 | A1* | 5/2015 | Wedig | G08B 7/066 |
| | | | | 340/501 |
| 2016/0169744 | A1* | 6/2016 | Apaydin | F24C 7/087 |
| | | | | 250/338.1 |
| 2017/0084156 | A1* | 3/2017 | Myllymaki | G08B 21/14 |
| 2018/0003392 | A1* | 1/2018 | Babu | F24C 7/082 |
| 2018/0081331 | A1* | 3/2018 | Gary, Jr. | H04L 12/2803 |
| 2018/0365942 | A1* | 12/2018 | Molloy | A61B 5/0402 |

* cited by examiner

INTELLIGENT VENT HOOD

TECHNICAL FIELD

This disclosure relates to property monitoring technology and, for example, utilizing video analytics and other sensors to monitor the activity at a monitored property.

BACKGROUND

Many people equip homes and businesses with monitoring systems to provide increased security for their homes and businesses. These monitoring systems include several electronic components including sensors that may detect several different activities within the monitored property.

SUMMARY

Techniques are described for monitoring technology. For example, techniques are described for integrating an in-home monitoring system with a vent hood that utilizes video analytics and other sensors to monitor a stove top.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for integrating an intelligent vent hood into the monitoring system of a monitored property. An intelligent vent hood is a stove vent hood that includes one or more infrared sensors and a camera, and is configured to perform video analytics. The one or more sensors may be passive infrared sensors that are capable of detecting heat from the surface of the stove below the vent hood, or thermal cameras that may capture images of heat around the stove. The vent hood may also include a smoke detector and a fire extinguisher. The vent hood is configured to perform video analytics on captured video data to determine whether the stove is attended by an adult user. The vent hood may generate an alert when the infrared sensors of the vent hood detect heat on the surface of the stove, and the vent hood determines from the video that the stove is not being attended by a user.

Figure 1:
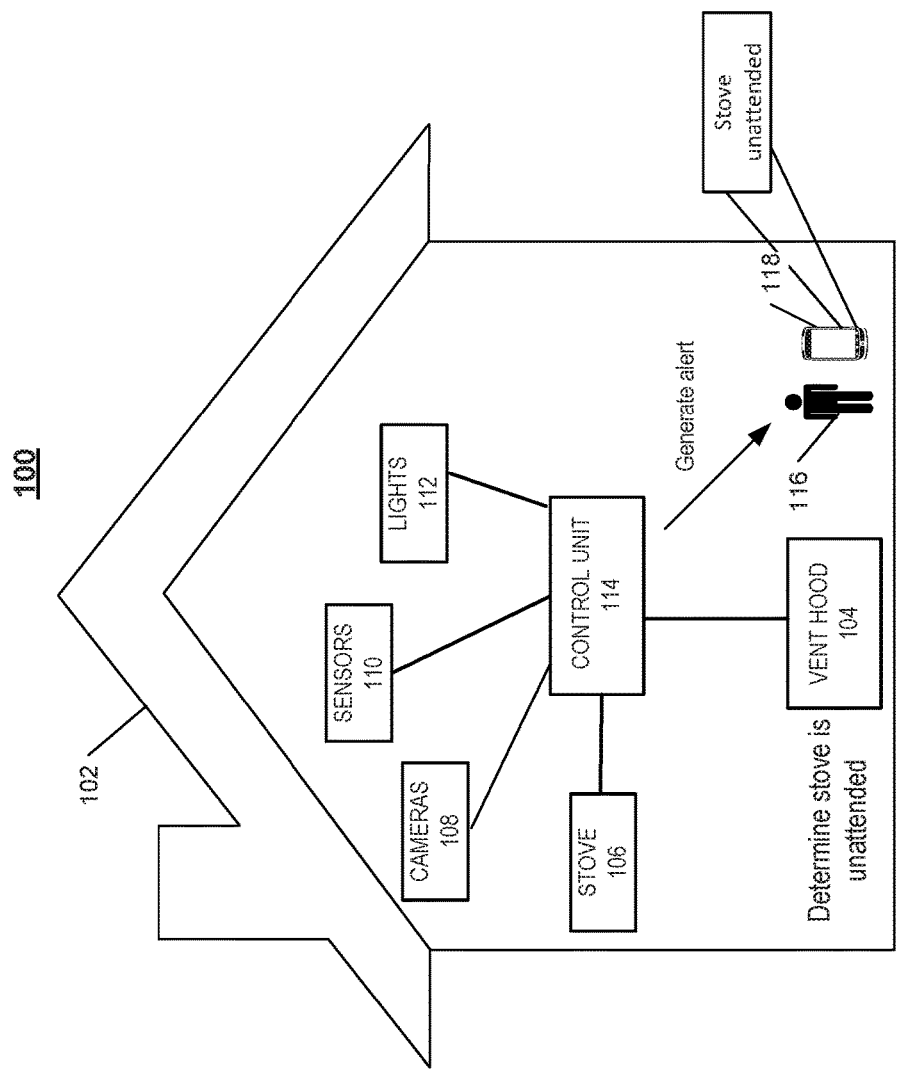
FIG. 1 illustrates an example of a property that is integrated with an intelligent vent hood.

FIG. 1 illustrates an example of a monitoring system 100 integrated with one or more electronic devices and an intelligent vent hood 104. As shown in FIG. 1, a property 102 (e.g. a home) of a user 116 is monitored by an in-home monitoring system (e.g. in-home security system) that includes components that are fixed within the property 102. The in-home monitoring system may include a control unit 114, one or more lights 112, one or more sensors 110, one or more cameras 108, a stove 106, and a vent hood 104. Each of the vent hood 104, the stove 106, the one or more cameras 108, the one or more sensors 110, and the one or more lights 112 communicate with the control unit 114 over a network.

Figure 2:
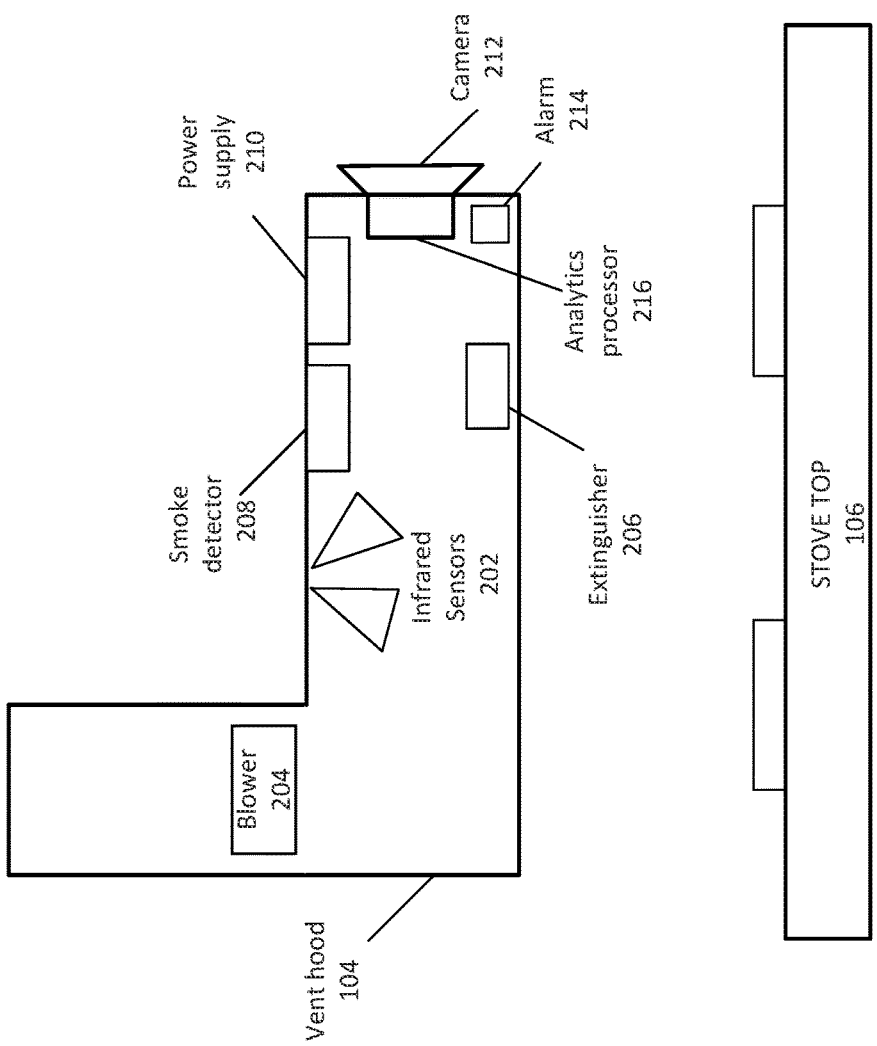
FIG. 2 illustrates an example of a side view of an intelligent vent hood.

FIG. 2 illustrates an example of a side view of an intelligent vent hood 104. The vent hood 104 is installed above the stove 106 as a typical vent hood. The vent hood 104 includes a blower 204 that is configured to extract smoke from the stove stop and one or more passive infrared sensors 202. The one or more infrared sensors 202 may be mounted along a length of the vent hood 104. In some implementations, instead of one or more infrared sensors 202 or additionally, the vent hood 104 may be equipped with thermal cameras that are configured to detect the temperature of the stove top 106.

As illustrated, the vent hood 104 may also include a smoke detector 208 and an extinguisher 206. In some examples, the vent hood 104 is connected to a power source at the property. In some examples, the vent hood 104 includes a battery power source that powers the different components of the vent hood 104. The vent hood 104 may include a class K fire extinguisher which is automatically turned on when a fire condition is detected. The camera 212 is located on the front surface of the vent hood 104 and is configured to include a majority of the kitchen within its field of view. The vent hood 104 also includes an alarm 214 with a speaker to generate audible alerts. The vent hood 104 includes an analytics processor 216 that analyzes the video data captured by the camera 212. In some implementations, the actions performed by the vent hood 104 described in FIG. 1 may be performed by the analytics processor 216. For example, the analytics processor 216 in the vent hood 104 may receive the temperature data from the one or more infrared sensors 202, determine when the detected temperature exceeds a temperature threshold, receive video data from the camera 212, determine whether an adult is within the field of view of the camera 212, and in response to determining that an adult is not within the field of view of the camera 212, generates an alarm.

The one or more infrared sensors 202 of the vent hood 104 are configured to detect heat from the surface of the stove 106. The one or more infrared sensors 202 of the vent hood 104 may be powered on intermittently to monitor the surface of the stove 106. A user may have the ability to configure the time period for powering on the one or more infrared sensors 202. For example, the user may set the one or more infrared sensors 202 to power on every ten seconds or very forty-five seconds. In other implementations, the one or more infrared sensors 202 remain powered on.

The vent hood 104 may include a knob that allows a user to toggle between different operating modes of the vent hood 104. The vent hood 104 may have one or more operating modes including a standby mode, an active mode, a cooling mode, and a boiling mode. The user may have the ability to select the operating mode of the vent hood 104 through a vent hood application on the user's mobile device. The vent hood application may be managed by a back end server that is located remote from the monitored property 102. The back end that manages the application may be in communication with the control unit 114 at the monitored property 102. In some implementations, the control unit 114 manages the vent hood application.

When the user selects the vent hood 104 to operate in standby mode, the one or more infrared sensors 202 power on after a user set time period to determine whether the stove is on and whether the stove is being attended by an adult. For example, the one or more infrared sensors 202 may power on every thirty seconds when in standby mode. The camera 212 on the vent hood 104 begins to capture video data when the one or more infrared sensors 202 are powered on, and detect heat from the stove 106 when the vent hood 104 is in standby mode.

The user may select the vent hood 104 to operate in active mode when the user is cooking a meal that has a long cook time. For example, the user may select the active mode when the resident is cooking a stew that cooks on the stove for two hours. When the vent hood 104 is in active mode, the user may specify the one or more temperature parameters for triggering the vent hood 104 to generate an alert to the user. For example, the user may specify that an alert should be generated when the temperate of the stove top 106 exceeds 300 degrees Fahrenheit when the vent hood is in active mode.

When the user selects the vent hood 104 to operate in cooling mode, the vent hood 104 may generate an alert to the user when the one or more infrared sensors 202 detect the stove top 106 cools to a desired temperature. The user may select this mode when the user places a hot item on the stove top to cool down. For example, the user may set the vent hood 106 to cooling mode after cooking a pot of soup, the vent hood 104 generates an alert to the user when the soup cools to the user set serving temperature. The user may specify the desired temperate when the user selects the cooling mode through the vent hood application on the user's mobile device. When the user selects the vent hood 104 to operate in boiling mode, the vent hood 104 may generate an alert to the user when the one or more infrared sensors 202 detect the stove top 106 heats up to a desired temperature. For example, the user may set the vent hood 106 to boiling mode when boiling water, and the vent hood 104 generates an alert to the user when the water is heated up to 212 degrees Fahrenheit.

In some examples, the one or more infrared sensors 202 may be binary type sensors that simply detect when the surface of the stove 106 is above the ambient room temperature. In these examples, the one or more infrared sensors 202 may compare the detected temperature to a temperature threshold, and may initiate video capture when the detected temperature meets or exceeds the temperature threshold. For example, the one or more infrared sensors 202 may detect when the temperature of the stove exceeds 90 degrees Fahrenheit. In other examples, the vent hood 104 may include one or more thermal cameras that utilize thermal imaging techniques to determine the temperature distribution of the heat over the stove top 106. In examples where the vent hood 104 is equipped with thermal cameras, the vent hood 104 may initiate video capture when the one or more thermal cameras detect at least one area of the stove top that exceeds a temperature threshold. For example, the one or more infrared sensors detect an area over a burner on the stove 106 exceeds 100 degrees Fahrenheit.

The vent hood 104 analyzes the generated heat map to determine that the heat generated from the surface of the stove 106 corresponds to the one or more burners of the stove 106. The vent hood 104 may detect a fire condition when the heat is not confined to the one or more burners of the stove 106. For example, when a grease fire occurs, the heat generated from the heat is dispersed over the surface of the stove.

When the one or more infrared sensors 202 detect heat, the camera 212 on the vent hood 104 initiates the capture of video data. The camera 212 may be located on the front surface of the vent hood 104, and may be configured to ensure that the kitchen boundaries are within the field of view (FOV) of the camera 212. In some examples, the vent hood 104 may include one or more cameras, or may include a camera that is configured to pan and or tilt to adjust its FOV so that the kitchen boundaries are within the FOV. In examples where the infrared sensors 202 are binary sensors, the camera 212 is powered on and begins to capture video data when the detected temperature exceeds a temperature threshold. For example, the infrared sensors may initiate video capture when the surface of the stove 106 exceeds 80 degrees Fahrenheit. As described above, the camera 212 may be located at the front surface of the vent hood 104. In some implementations, the vent hood 104 may include one or more cameras.

An analytics processor 216 analyzes the video data captured by the camera 212 using one or more different techniques to determine whether an adult human is within the field of view of the camera 212 of the vent hood 104. The processor may compare the height of a human to a height threshold, and may determine that the human is an adult based on their height reaching or exceeding the height threshold.

When an adult human is determined to be within the field of view of the camera 212 of the vent hood 104, the vent hood 104 returns to standby mode. As illustrated in FIG. 1, when the processor 216 determines that an adult human is not within the field of view of the camera 212, the vent hood 104 determines the stove 106 is unattended. When the processor 216 determines that an adult is not within the field of view camera 212, the vent hood 104 may communicate wirelessly with control unit 114. In some implementations, the vent hood 104 may be configured to communicate with the control unit 114 over a wired connection. Based on the data received from the vent hood 104, the control unit 114 communicates a notification to a user device, such as a smart phone, of a resident of the monitored property 102. The notification may notify the resident that the stove 106 is on and is unattended. In some implementations, the notification is communicated to the user device of the resident after the stove 106 has been unattended for a predetermined period of time. For example, the control unit 114 communicates a notification to the resident when an adult is not detected within the field of view of the camera 212 of the vent hood 104 for sixty seconds. In some implementations, the vent hood 104 generates an alert when the camera 212 detects that a child is the only person within the field of view of the camera 212. For example, when the processor 216 determines that the person within the field of camera 212 does not meet the height threshold.

In some implementations, the vent hood 104 simultaneously generates an audible alert. In these implementations, the alarm 214 on the vent hood 104 generates a beeping alert to indicate to the residents of the property that the stove 106 is on and unattended. In some examples, the vent hood 104 may generate a voice command from a speaker on the vent hood 104 alerting the residents to the unattended stove 106. In some implementations, the electronic notification to the resident's user device is sent prior to generating the audible alert. In other implementations, the audile alert is generated prior to communicating an electronic notification to the resident's user device.

The alert may be generated a predetermined amount of time after the vent hood 104 determines the stove 106 is unattended. For example, the vent hood 104 may generate an alert twenty, thirty, sixty, or some other amount of seconds after determining the stove 106 is unattended. The vent hood 104 may not generate an alert when an adult moves into the field of view of the camera within a predetermined time period from the initial determination by the camera. For example, when an adult moves back into the field of view during the thirty seconds after the vent hood 104 determines the stove 106 was unattended, then the vent hood 104 does not generate the alert. The vent hood 104 may reenter standby mode when the adult is detected within the field of view of the camera 212.

As illustrated in FIG. 1, the vent hood 104 may simultaneously communicate with the control unit 114, and the control unit 114 may generate an alert notification to the user device 118 of the user 116. In some implementations, the audible alert generated by the vent hood 104 and the alert communicated from the control unit 114 to the user device 118 of the user 116 occur simultaneously. In other implementations, the alert communicated from the control unit 114 to the user device 118 is communicated a predetermined time after the alert is generated from the vent hood 104. For example, the control unit 114 communicates the alert to the user device 118 sixty seconds after the vent hood determines the stove is unattended. The control unit 114 may not communicate an alert to the user device 118 of the user 116 when an adult moves into the field of view of the camera of the vent hood 104 after the vent hood generated an alert.

The control unit 114 may determine which of a one or more user devices of the one or more residents of the property 102 to communicate the alert. In some implementations, the control unit 114 communicates the notification to each of the user devices of users that are within a predetermined distance from the monitored property 102. In these implementations, the control unit 114 determines the GPS coordinates of each of the one or more user devices of the residents of the property 102, and communicates the notification to the devices whose GPS coordinates are within the predetermined distance. In other implementations, a resident may identify which of the one or more user devices should receive the notification. In these implementations, the resident may access a vent hood application on the resident's user device to identify the particular user devices to send the alert. The vent hood application may be managed by a back end server that is located remote from the monitored property. The back end server that manages the application may be in communication with the control unit 114 at the monitored property 102. In some implementations, the control unit manages the vent hood application.

In some implementations, the vent hood 104 may include one or more toggles that may be selected by a user to toggle between one or more vent hood cooking modes. For example, the resident may select a physical knob on the vent hood 104 to place the vent hood 104 into an active mode.

The resident user may access the vent hood application to configure the settings for the vent hood 104. The user may specify how often the one or more infrared sensors 202 should be powered on to monitor the stove top 106 temperature. For example, the user may configure the one or more infrared sensors to power on every ten seconds or every thirty seconds. The user may also configure the time period before generating an alert. For example, the user may configure the vent hood 104 to generate an alert when the camera has not detected a person within the field of view in thirty seconds. The user may also configure the preferences for the generation of alerts. For example, the user may set the vent hood 104 to generate an audible alert followed by a notification sent to the user device of the resident. For another example, the user may set the vent hood to generate the notification and the audible alert simultaneously.

The resident user may specify the temperature thresholds for one or more other vent hood modes. The vent hood 104 may include a cooling mode. The user may select this mode when the user places a warm item from the oven on the surface of the stove to cool. When the vent hood 104 is in this mode, the vent hood 104 generates an alert when the temperature of the item on the stove top 106 decreases to a user set desired temperature. In some implementations, the user may define one or more vent hood modes and associated temperature thresholds through the vent hood application. For example, the user may define a boiling water vent hood mode. In this example, the user may configure the vent hood 104 to generate an alert when the pot of water on the stove gets to 212 degrees Fahrenheit. In some implementations, the user may specify temperature thresholds for each of the one or more burners on the stove. In these implementations, the user may set one burner to boiling water mode and set a second burner to active mode. The user may also configure the vent hood 104 to generate one or more different alerts based on the particular burner that causes the alert.

When the one or more infrared sensors detect a change in temperature of the stove top 106, the new detected temperature is compared a temperature threshold associated with the selected vent hood mode. For example, when the vent hood is in the boiling water mode, the one or more infrared sensors detect when the temperature of a pot of water increases as the water heats up, when the detected temperature is 212 degrees Fahrenheit threshold, the vent hood 104 generates an alert.

The vent hood 104 generates an alert when the detected temperature meets the temperature threshold for the selected vent hood mode. The type of alert generated may be based on the user settings associated with the selected vent hood mode. For example, when the stove 106 is in active mode and the temperature exceeds 300 degrees Fahrenheit, the vent hood 104 may sound an audible alert. In some examples, the vent hood 104 may sound an audible alert and simultaneously generate a notification to the resident's device. In some examples, the vent hood 104 generates an alert when an item that is cooling on the stove top reaches the desired temperature.

In some implementations, the vent hood 104 generates an alert when the vent hood 104 detects a fire condition. The one or more infrared sensors 202 of the vent hood 104 may detect a fire condition when the temperature of the stove 106 exceeds a critical threshold temperature. For example, when the temperature of the stove top 106 exceeds 500 degrees Fahrenheit. The smoke detector 208 of the vent hood 104 may detect the smoke generated over the stove top 106. When the one or more infrared sensors 202 detect the temperature exceeds the threshold, and the smoke detector 208 detects smoke, the camera 212 may be powered on to confirm the status of the stove 106. The vent hood 104 confirms a fire condition when these conditions are detected and the camera confirms that an adult is not within the FOV of the camera 212.

In some implementations, when a fire condition is detected, the extinguisher 206 is switched on until the temperature of the stove top 106 is reduced to room temperature. In other implementations, where the stove 106 is a smart stove that is in communication with the control unit 114, the vent hood 104 communicates with the control unit 114, and the control unit 114 in turn commands the one or more burners on the stove 106 to switch off. The vent hood 104 may simultaneously generate an audible alert when a fire condition is detected. When the camera 212 detects that an adult is within the field of view of the camera 212, the vent hood 104 assumes the resident is cooking and does not generate an alert. The speed of the blower 204 of the vent hood 104 may be increased to remove the smoke produced.

In some implementations, the vent hood 104 generates an alert when the smoke detector 208 detects an increase in the rate of production of smoke from the stove top 106. In these implementations, when the smoke detector 208 detectors the increased rate of smoke production, the camera 212 may be switched on. The speed of the blower 204 may be increased simultaneously to remove the excess smoke. The vent hood 104 may generate an audible alert from alarm 214. In other implementations, the event hood 104 generates an alert when the one or more infrared sensors 202 detect a rapid increase in the temperature of the stove top 106.

FIG. 2 illustrates an example of a side view of an intelligent vent hood 104. The vent hood 104 is installed above the stove 106 as a typical vent hood. The vent hood 104 includes a blower 204 that is configured to extract smoke from the stove stop and one or more passive infrared sensors 202. The one or more infrared sensors 202 may be mounted along a length of the vent hood 104. In some implementations, instead of one or more infrared sensors 202 or additionally, the vent hood 104 may be equipped with thermal cameras that are configured to detect the temperature of the stove top 106.

As illustrated, the vent hood 104 may also include a smoke detector 208 and an extinguisher 206. In some examples, the vent hood 104 is connected to a power source at the property. In some examples, the vent hood 104 includes a battery power source that powers the different components of the vent hood 104. The vent hood 104 may include a class K fire extinguisher which is automatically turned on when a fire condition is detected. The camera 212 is located on the front surface of the vent hood 104 and is configured to include a majority of the kitchen within its field of view. The vent hood 104 also includes an alarm 214 with a speaker to generate the audible alerts. The vent hood 104 includes an analytics processor 216 that analyzes the video data captured by the camera 212. In some implementations, the actions performed by the vent hood 104 described in FIG. 1 may be performed by the analytics processor 216. For example, the analytics processor 216 in the vent hood 104 may receive the temperature data from the one or more infrared sensors 202, determine when the detected temperature exceeds a temperature threshold, receive video data from the camera 212, determine whether an adult is within the field of view of the camera 212, and in response to determining that an adult is not within the field of view of the camera 212, generates an alarm.

Figure 3:
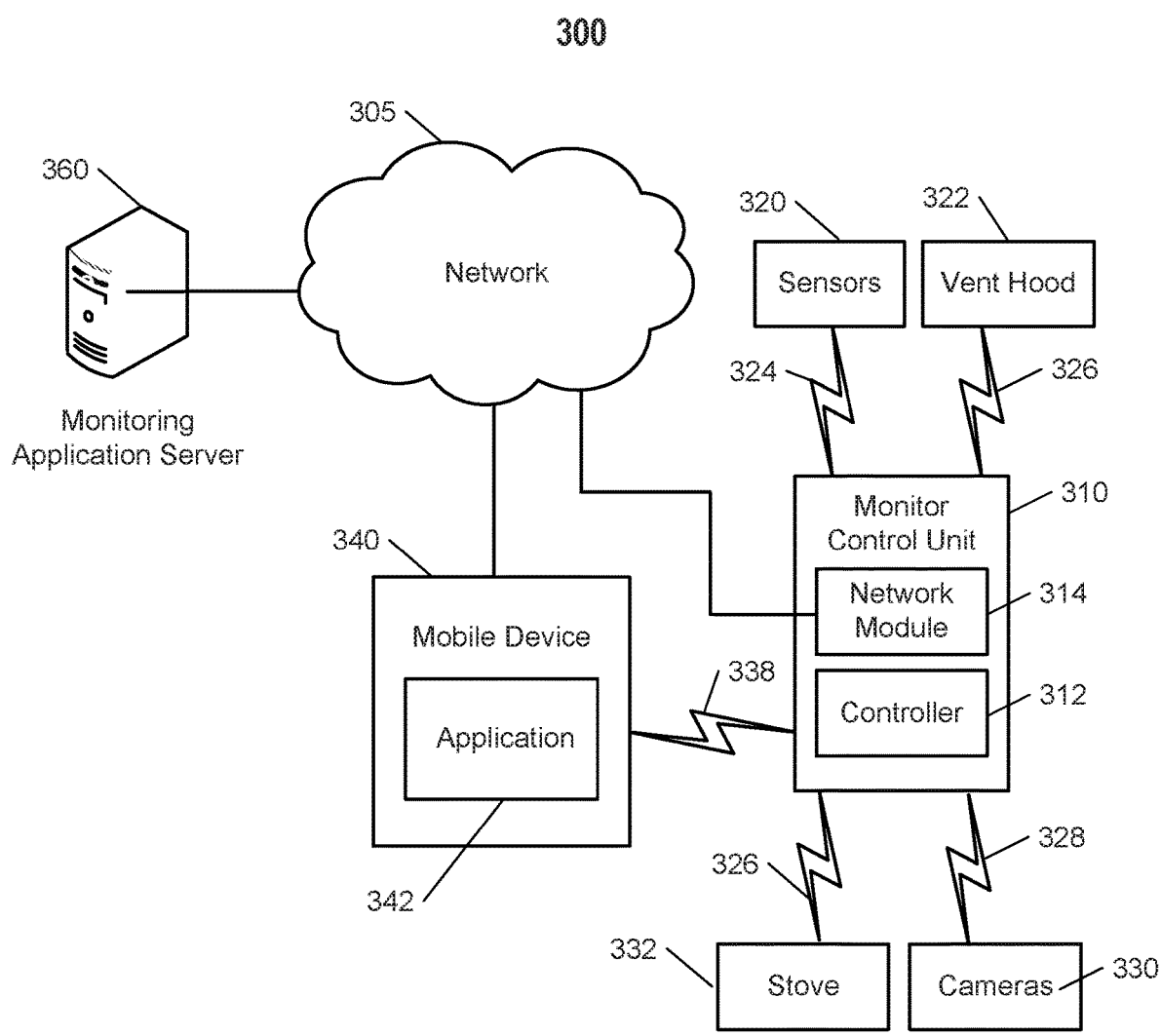
FIG. 3 illustrates an example of a monitoring system integrated with an intelligent vent hood.

FIG. 3 illustrates an example of a monitoring system 300 integrated with an intelligent vent hood. The system 300 includes a monitoring system control unit 310, one or more user devices 340, and a monitoring application server 360. A network 305 facilitates communications between the monitoring system control unit 310, the one or more user devices 340, and the monitoring application server 360. The network 305 is configured to enable exchange of electronic communications between devices connected to the network.

For example, the network 305 may be configured to enable exchange of electronic communications between the monitoring system control unit 310, the one or more user devices 340, and the monitoring application server 360. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network may be a wireless network, a broadband network, or a combination of networks including a wireless network and a broadband network.

The monitoring system control unit 310 includes a controller 312 and a network module 314. The controller 312 is configured to control a monitoring system (e.g., a home alarm or security system) that includes the monitor control unit 310. In some examples, the controller 312 may include a processor or other control circuitry configured to execute instructions of a program that controls operation of an alarm system. In these examples, the controller 312 may be configured to receive input from a vent hood, sensors, detectors, or other devices included in the alarm system and control operations of devices included in the alarm system or other household devices (e.g., a thermostat, an appliance, lights, etc.). For example, the controller 312 may be configured to control operation of the network module 314 included in the monitoring system control unit 310.

The network module 314 is a communication device configured to exchange communications over the network. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the monitoring control unit 310 to communicate over a local area network and/or the Internet. The network module 314 also may be a voiceband modem configured to enable the alarm panel to communicate over the telephone lines of Plain Old Telephone Systems (POTS).

The monitoring system may include an intelligent vent hood 322. The vent hood 322 may be in communication with the monitor control unit 310. In some implementations, the vent hood 322 may communicate with the monitor control unit 310 through Zwave, Zigbee, BLE, LoRA, LPWan, GSM, CDMA, LTE, Wi-Fi, Powerline, PoE, Ethernet, other wireline, proprietary 900 Mhz/2.4 Gz/other radio frequency, or any other suitable method of communication.

The monitoring system may include multiple sensors 320. The sensors 320 may include a contact sensor, a motion sensor, a glass break sensor, or any other type of sensor included in an alarm system or security system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 320 may include a radio-frequency identification (RFID) sensor that identifies a particular article that includes a pre-assigned RFID tag.

The one or more cameras 330 may be a video/photographic camera or other type of optical sensing device configured to capture images. For instance, the one or more cameras 330 may be configured to capture images of an area within a building monitored by the monitor control unit 310. The one or more cameras 330 may be configured to capture single, static images of the area and also video images of the area in which multiple images of the area are captured at a relatively high frequency (e.g., thirty images per second). The one or more cameras 330 may be controlled based on commands received from the monitor control unit 310.

The one or more cameras 330 may be triggered by several different types of techniques. For instance, a Passive Infra Red (PIR) motion sensor may be built into the one or more cameras 330 and used to trigger the one or more cameras 330 to capture one or more images when motion is detected. The one or more cameras 330 also may include a microwave motion sensor built into the camera and used to trigger the camera to capture one or more images when motion is detected. Each of the one or more cameras 330 may have a "normally open" or "normally closed" digital input that can trigger capture of one or more images when external sensors (e.g., the sensors 320, PIR, door/window, etc.) detect motion or other events. In some implementations, at least one camera 330 receives a command to capture an image when external devices detect motion or another potential alarm event. The camera may receive the command from the controller 312 or directly from one of the sensors 320.

In some examples, the one or more cameras 330 triggers integrated or external illuminators (e.g., Infra Red, Z-wave controlled "white" lights, lights controlled by the module 314, etc.) to improve image quality when the scene is dark. An integrated or separate light sensor may be used to determine if illumination is desired and may result in increased image quality.

The sensors 320, the vent hood 322, and the cameras 330 communicate with the controller 312 over communication links 324, 326, and 328. The communication links 324, 326, and 328 may be a wired or wireless data pathway configured to transmit signals from the sensors 320, the light/camera devices 322, and the cameras 330 to the controller 312. The communication link 324, 326, and 328 may include a local network, such as, 802.11 "Wi-Fi" wireless Ethernet (e.g., using low-power Wi-Fi chipsets), Z-Wave, Power Over Ethernet (POE), Zigbee, Bluetooth, "HomePlug" or other Powerline networks that operate over AC wiring, and a Category 5 (CAT5) or Category 6 (CAT6) wired Ethernet network.

The monitoring application server 360 is an electronic device configured to provide monitoring services by exchanging electronic communications with the monitor control unit 310, and the one or more user devices 340, over the network 305. For example, the monitoring application server 360 may be configured to monitor events (e.g., alarm events) generated by the monitor control unit 310. In this example, the monitoring application server 360 may exchange electronic communications with the network module 314 included in the monitoring system control unit 310 to receive information regarding events (e.g., alarm events) detected by the monitoring system control unit 310. The monitoring application server 360 also may receive information regarding events (e.g., alarm events) from the one or more user devices 340.

The one or more user devices 340 are devices that host and display user interfaces. The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc. The one or more user devices may include a desktop computer or a laptop computer.

The user device 340 includes a native surveillance application 342. The native surveillance application 342 refers to a software/firmware program running on the corresponding mobile device that enables the user interface and features described throughout. The user device 340 may load or install the native surveillance application 342 based on data received over a network or data received from local media. The native surveillance application 342 runs on mobile devices platforms, such as iPhone, iPod touch, Blackberry, Google Android, Windows Mobile, etc. The native surveillance application 342 enables the user device 340 to receive and process image and sensor data from the monitoring system.

In some implementations, the one or more user devices 340 communicate with and receive monitoring system data from the monitor control unit 310 using the communication link 338. For instance, the one or more user devices 340 may communicate with the monitor control unit 310 using various local wireless protocols such as Wi-Fi, Bolt, Lora, Bluetooth, Z-Wave, Zigbee, "HomePlug," or other Powerline networks that operate over AC wiring, or Power over Ethernet (POE), or wired protocols such as Ethernet and USB, to connect the one or more user devices 340 to local security and automation equipment. The one or more user devices 340 may connect locally to the monitoring system and its sensors and other devices. The local connection may improve the speed of status and control communications because communicating through the network 305 with a remote server (e.g., the monitoring application server 360) may be significantly slower.

Although the one or more user devices 340 are shown as communicating with the monitor control unit 310, the one or more user devices 340 may communicate directly with the sensors and other devices controlled by the monitor control unit 310. In some implementations, the one or more user devices 340 replace the monitoring system control unit 310 and perform the functions of the monitoring system control unit 310 for local monitoring and long range/offsite communication.

Figure 4:
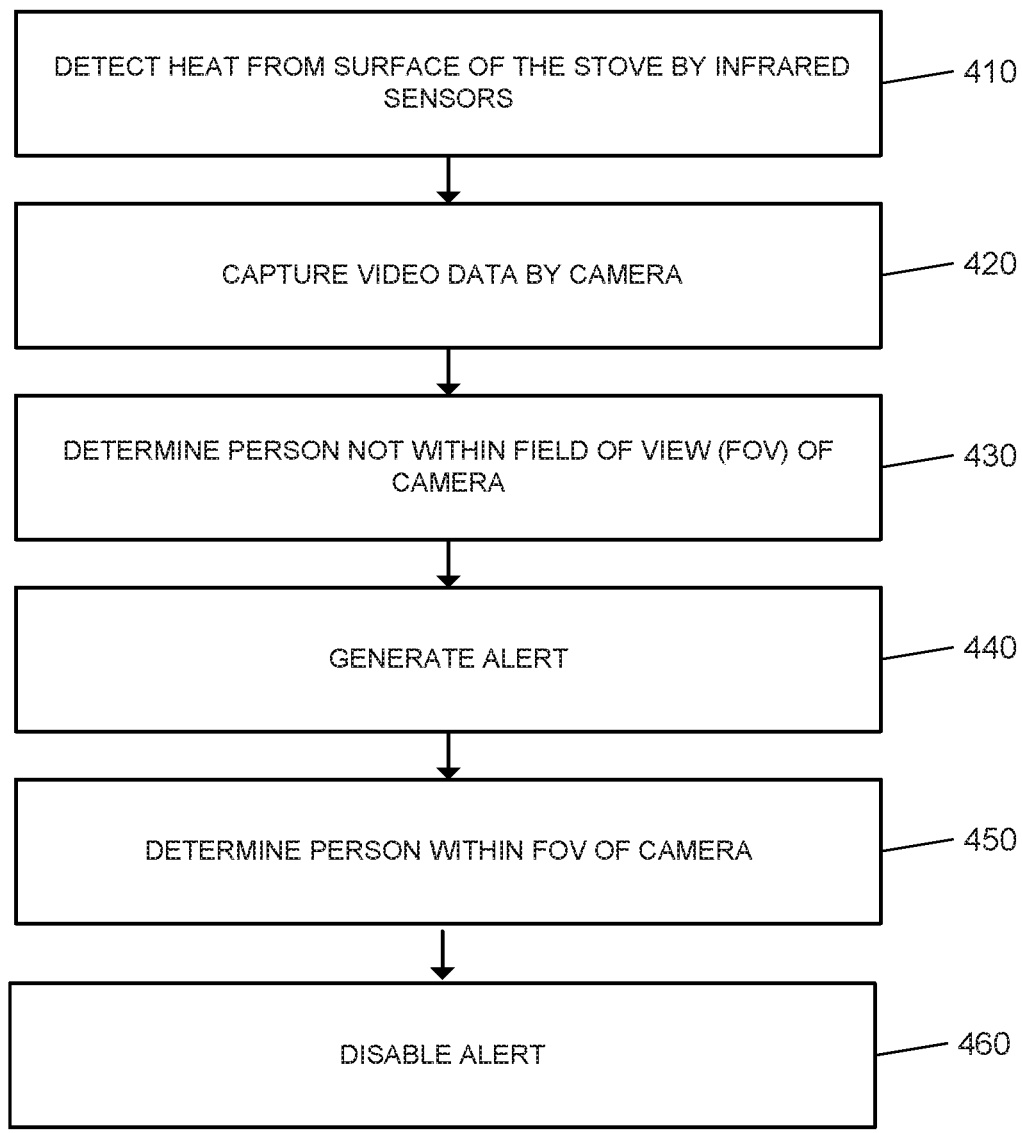
FIG. 4 is a flow chart of an example process for disabling an alert.

FIG. 4 illustrates an example process 400 for disabling an alert. The one or more infrared sensors 202 of the vent hood 104 detect heat from the surface of the stove 106 (410). For example, the one or more infrared sensors 202 detect the temperature of the stove 106 exceeds the 90 degrees Fahrenheit temperature threshold. The camera of the vent hood captures video data (420). For example, when the infrared sensors 202 detect heat from the surface of the stove 106, the camera 212 is powered on and begins to capture video data.

The analytics processor 216 determines that a person is not within the field of view of the camera (430). For example, the analytics processor 216 determines a person within the field of view of the camera 212 does not meet the height threshold for an adult. The vent hood generates an alert (440). For example, the alarm on the vent hood 104 generates an audible alert when an adult is not determined to be within the field of view of the camera 212.

The analytics processor 216 of the vent hood 104 determines a person within the field of view of the camera 212 (450). When an adult human moves into the field of view of the camera 212, the vent hood 104 disables the alert (460). In some examples, where the control unit 114 generates a notification to the user device of the resident user, the control unit 114 generates a second notification indicating that an adult is now present.

Figure 5:
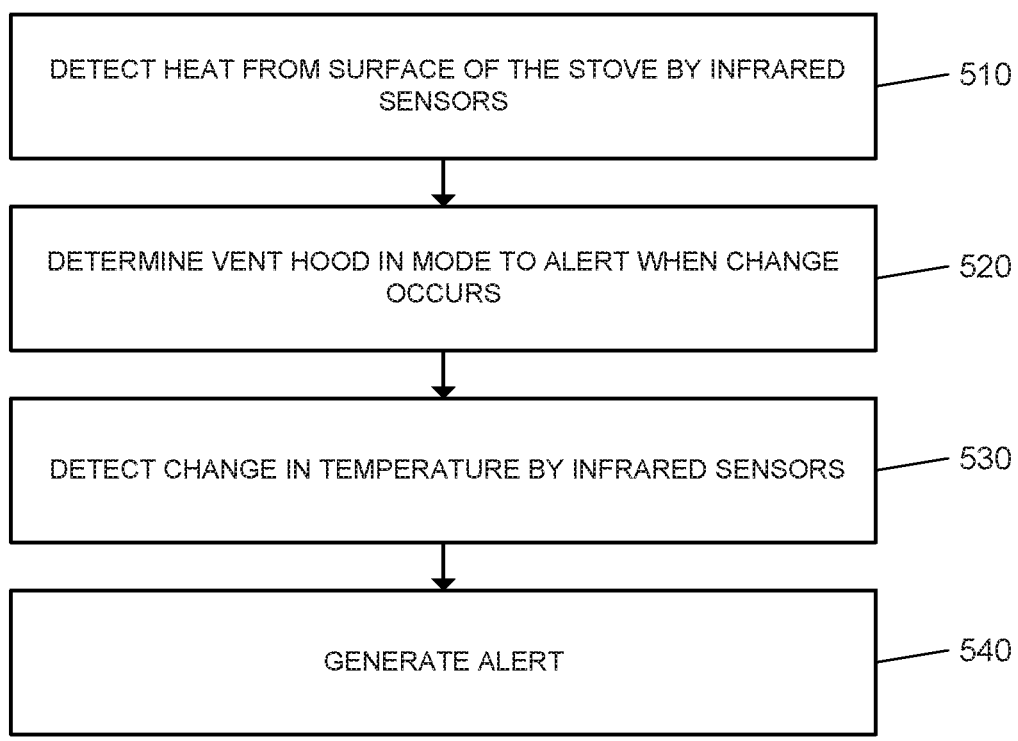
FIG. 5 is a flow chart of an example process for generating an alert.

FIG. 5 illustrates an example process 500 for generating an alert. The one or more infrared sensors 202 of the vent hood 104 detect heat from the surface of the stove 106 (510). For example, the one or more infrared sensors 202 detect heat from a warm item on the surface of the stove 106. A resident may remove a baked item from the oven and place the item on the stove top 106 to cool down to serving temperature. The vent hood 104 determines it is in a mode to alert when a change occurs (520). For example, the vent hood 104 determines that a user selects a boiling water mode knob on the vent hood 104.

The one or more infrared sensors 202 detect a change in temperature (530). For example, the one or more infrared sensors 202 detect when the temperature of a pot of water reaches 212 degrees Fahrenheit. In another example, when in cooling mode, the one or more infrared sensors 202 detect when the temperature of an item on the stove 106 is cooled down to 100 degrees Fahrenheit. Based on the generated heat map, the one or more infrared sensors 202 of the vent hood 104 may detect when an area other that the one or more burners on the stove top 106 exceeds room temperature. For example, a utensil placed on the stove 106 may experience an increase in temperature. The one or more infrared sensors 202 may detect when the temperature of the stove top 106 is increasing at a rapid rate. For example, the one or more infrared sensors 202 detect when the temperate increase by 100 degrees in two minutes.

The vent hood generates an alert (540). For example, when the stove 106 is in active mode and the temperature exceeds 300 degrees Fahrenheit, the vent hood 104 may sound an audible alert.

Figure 6:
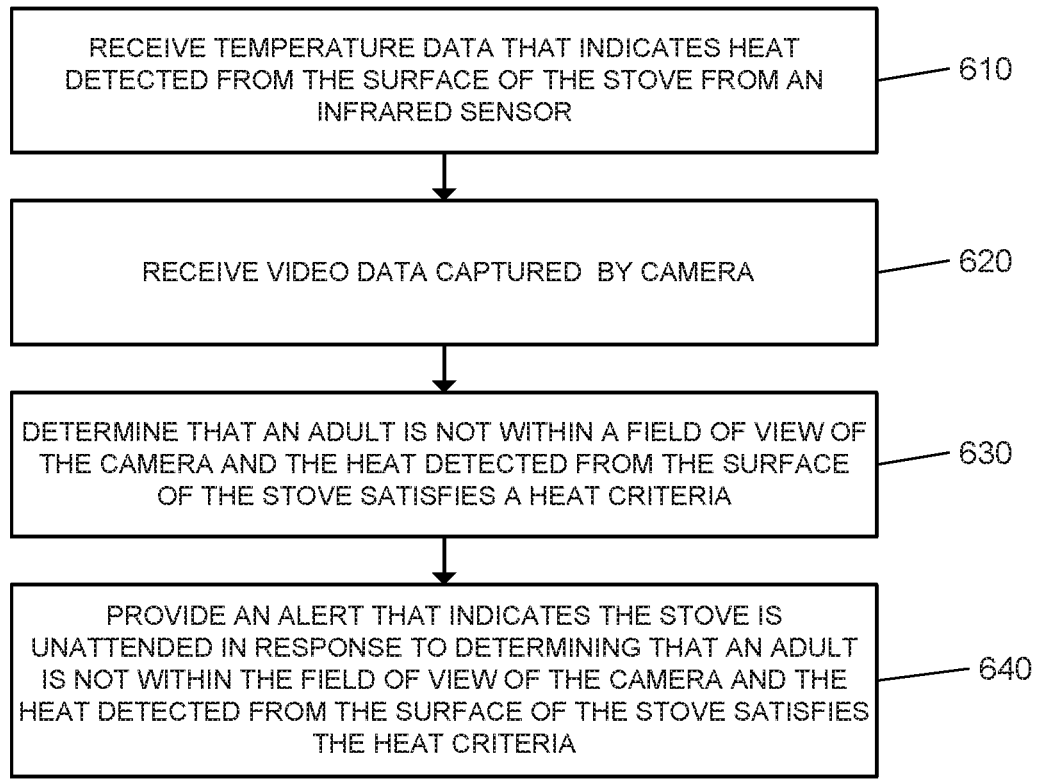
FIG. 6 illustrates an example process for providing an alert that indicates the stove is unattended.

FIG. 6 illustrates an example process 600 for providing an alert that indicates the stove is unattended. The process 600 may be performed by a processor of a vent hood device that monitors a stove. The process 600 includes the processor receiving from the infrared sensor, temperature data that indicates heat detected from the surface of the stove (610). For example, the processor 216 receives temperature data from the one or more infrared sensors 202. The one or more infrared sensors 202 may be powered on intermittently, in these examples, the processor 216 may receive the temperature data periodically. In other examples, the one or more infrared sensors 202 remain powered on. In these examples, the processor 216 constantly receives temperature data from the one or more infrared sensors 202. The one or more infrared sensors 202 may detect when the temperature of the stove 106 exceeds a temperature threshold or heat criteria.

The processor receives video data captured by the camera of the vent hood (620). For example, the camera 212 is powered on and begins to capture video data, the video data is communicated to the processor 216. In some implementations, the camera 212 begins to capture video data in response to the processor receiving temperature data indicating that the temperature of the stove 106 exceeds a temperature threshold or heat criteria. The processor determines that an adult is not within a field of view of the camera and the heat detected from the surface of the stove satisfies a heat criteria (630). For example, the processor 216 determines that a person in the field of view is not an adult, based on the height of the person not meeting a height threshold for an adult. The processor 216 analyzes the video data captured by the camera 212 using one or more different techniques to determine whether an adult human is within the field of view of the camera 212 of the vent hood 104. The processor 216 may compare the height of a human to a height threshold, and may determine that the human is an adult based on their height reaching or exceeding the height threshold. In some examples, the processor is configured to determine whether the person in the field of view of the camera is an adult or a child using one or more facial analysis techniques. The processor may recognize the appearance, gait, or facial features of the residents of the home to determine whether a person in the field of view of the camera is an adult resident or a child resident.

The processor provides an alert that indicates the stove is unattended in response to determining that an adult is not within the field of view of the camera and the heat detected from the surface of the stove satisfies the heat criteria (640). For example, the processor 216 provides an electronic notification to a resident's user device. In some examples, the processor 216 provides an alert by commanding an alarm on the vent hood to generate a beeping alert. In other examples, the processor 216 provides an alert by commanding the speaker on the vent hood to output a voice command indicating that the stove is unattended.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A vent hood device that is configured to monitor a stove, the vent hood device comprising:
    a camera;
    an infrared sensor that is configured to detect heat from a surface of the stove; and
    a processor that is configured to:
        receive, from the infrared sensor, temperature data that indicates that a burner of a stove is turned on;
        determine from the temperature data from the infrared sensor that the burner of the stove is turned on;
        in response to determining from the temperature data from the infrared sensor that the burner of the stove is turned on, begin capturing video with the camera and determining from video captured by the camera whether an adult is within a field of view of the camera;
        based on determining from the video captured by the camera that the adult is not within the field of view of the camera, provide an alert that indicates that the stove is unattended;
        receive, from the camera, additional video data captured by the camera;
        determine, based on the additional video data that the adult is within the field of view of the camera; and
        based on determining that the adult is within the field of view of the camera, end an output of the alert.

2. The vent hood device of claim 1, wherein the processor is configured to determine from the temperature data from the infrared sensor that the burner of the stove is turned on by determining that the heat detected from the surface of the stove satisfies a heat criteria.

3. The vent hood device of claim 2 wherein, the heat criteria comprises the heat detected from the surface of the stove exceeding a heat threshold.

4. The vent hood device of claim 1, wherein the processor is configured to provide an alert that indicates that the stove is unattended by providing an electronic notification to a resident's user device.

5. The vent hood device of claim 1, wherein the processor is configured to provide an alert that indicates that the stove is unattended by providing a beeping alert from an alarm on the vent hood.

6. The vent hood device of claim 1, wherein the processor is configured to provide an alert that indicates that the stove is unattended by providing a voice command from a speaker on the vent hood.

7. The vent hood device of claim 1, further comprising:
    a thermal camera that is configured to utilize thermal imaging techniques to determine a temperature distribution of heat over the stove, and
    the processor is further configured to:
        receive, from the thermal camera, data indicating an area of the stove satisfies a temperature criteria; and
        based on receiving data indicating an area of the stove satisfies the temperature criteria, receive, from the camera, video data captured by the camera;
        determine, based on the video data, that the adult is not within a field of view of the camera; and
        in response to determining that the adult is not within the field of view of the camera and the data indicating an area of the stove satisfies the temperature criteria, provide an alert that indicates that the stove is unattended.

8. The vent hood device of claim 1, wherein the processor is configured to provide an alert that indicates that the stove is unattended by providing an electronic notification to a resident's user device, and simultaneously providing an audible alarm, and wherein the processor is configured to end the output of the alert by ending the audible alarm.

9. The vent hood device of claim 1, wherein the processor is configured to provide the alert that indicates that the stove is unattended based on determining that the stove has been turned on and unattended for at least a predetermined period of time, wherein the predetermined period of time is more than thirty seconds.

10. The vent hood device of claim 1, wherein the processor is configured to detect that a child is within the field of view of the camera, an adult is not within the field of view of the camera, and the stove is turned on and, in response, output a second alert that indicates that the child is near the stove.

11. A computer-implemented method comprising:
    receiving, from an infrared sensor located on a vent hood device that monitors a stove, temperature data that indicates that a burner of the stove is turned on;
    determining from the temperature data from the infrared sensor that the burner of the stove is turned on;
    in response to determining from the temperature data from the infrared sensor that the burner of the stove is turned on, begin capturing video with a camera and determining from video captured by the camera whether an adult is within a field of view of the camera;

based on determining from the video captured by the camera that the adult is not within the field of view of the camera, providing an alert that indicates that the stove is unattended;
receiving, from the camera, additional video data captured by the camera;
determining, based on the additional video data that the adult is within the field of view of the camera; and
based on determining that the adult is within the field of view of the camera, ending an output of the alert.

12. The method of claim 11, wherein determining from the temperature data from the infrared sensor that the burner of the stove is turned on comprises:
determining that heat detected from a surface of the stove satisfies a heat criteria.

13. The method of claim 12, wherein the heat criteria comprises the heat detected from the surface of the stove exceeding a heat threshold.

14. The method of claim 11, wherein providing an alert that indicates that the stove is unattended comprises:
providing an electronic notification to a resident's user device.

15. The method of claim 11, wherein providing an alert that indicates that the stove is unattended comprises:
providing a beeping alert from an alarm on the vent hood.

16. A non-transitory computer-readable medium storing software comprising instructions executable by one or more computers which, upon such execution, cause the one or more computers to perform operations comprising:
receiving, from an infrared sensor located on a vent hood device that monitors a stove, temperature data that indicates that a burner of the stove is turned on;
determining from the temperature data from the infrared sensor that the burner of the stove is turned on;
in response to determining from the temperature data from the infrared sensor that the burner of the stove is turned on, begin capturing video with a camera and determining from video captured by the camera whether an adult is within a field of view of the camera;
based on determining from the video captured by the camera that the adult is not within the field of view of the camera, providing an alert that indicates that the stove is unattended;
receiving, from the camera, additional video data captured by the camera;
determining, based on the additional video data that the adult is within the field of view of the camera; and
based on determining that the adult is within the field of view of the camera, ending an output of the alert.

* * * * *